United States Patent
Fehring

[19]

[11] Patent Number: 6,022,030
[45] Date of Patent: Feb. 8, 2000

[54] ROLL STABILIZER FOR MOTOR VEHICLE

[75] Inventor: John David Fehring, Waynesville, Ohio

[73] Assignee: General Motors Corporation, Detroit, Minn.

[21] Appl. No.: 09/126,128

[22] Filed: Jul. 30, 1998

[51] Int. Cl.$^7$ ............................................. B60G 21/055
[52] U.S. Cl. ........................... 280/5.511; 280/124.106; 280/124.107; 267/277
[58] Field of Search ................... 280/5.511, 124.106, 280/124.107, 124.149, 124.152; 267/273, 277

[56] References Cited

U.S. PATENT DOCUMENTS

| | | | |
|---|---|---|---|
| 1,992,527 | 2/1935 | Garratt | 192/41 |
| 2,998,263 | 8/1961 | Muller | 280/5.511 |
| 3,054,486 | 9/1962 | General et al. | 192/41 |
| 4,648,620 | 3/1987 | Nuss | 280/5.511 |
| 4,796,911 | 1/1989 | Kuroki et al. | 280/689 |
| 4,973,078 | 11/1990 | Barthelemy et al. | 280/5.511 |
| 5,161,822 | 11/1992 | Lund | 267/277 |
| 5,186,486 | 2/1993 | Hynds et al. | 280/689 |
| 5,431,431 | 7/1995 | Fulks et al. | 280/721 |
| 5,521,926 | 5/1996 | Aulerick et al. | 280/124.152 |
| 5,529,324 | 6/1996 | Krawczyk et al. | 280/124.106 |
| 5,580,079 | 12/1996 | Pradel et al. | 280/5.511 |
| 5,882,017 | 3/1999 | Carleer | 280/5.508 |

FOREIGN PATENT DOCUMENTS 2006131A  5/1979  United Kingdom.

*Primary Examiner*—Christopher P. Ellis
*Attorney, Agent, or Firm*—Robert M. Sigler

[57] ABSTRACT

A dynamically variable roll stabilizer for a motor vehicle including a split U-shaped torsion bar on a body of the motor vehicle, a pair of rigid links between opposite ends the torsion bar and respective ones of a pair of suspension control arms of the motor vehicle, a mechanical coupling between the two separate elements of the torsion bar, and an electromagnetic actuator. The coupling includes a pair of oppositely acting roller clutches between the two separate elements of the split torsion bar. The electromagnetic actuator includes a pair of control rings which engage and disengage the roller clutches, a pair of control levers on the control rings, and an electric solenoid suspended between the control levers. When the solenoid is on, the control levers are thrust together and the control rings disengage the roller clutches. When the solenoid is off, the control levers are thrust apart by a spring and the control rings engage the roller clutches. The effective torsion modulus of the torsion bar is maximum when the roller clutches are engaged and zero when the roller clutches are disengaged.

7 Claims, 2 Drawing Sheets

ROLL STABILIZER FOR MOTOR VEHICLE

TECHNICAL FIELD

This invention relates to a roll stabilizer for a motor vehicle.

BACKGROUND OF THE INVENTION

A roll stabilizer is an apparatus on a motor vehicle body which increases the stiffness of a suspension system of the motor vehicle on one side or the other of the vehicle in response to pivotal movement of the body about a longitudinal roll axis to reduce the amplitude of such pivotal movement. A typical roll stabilizer is a U-shaped torsion bar on the vehicle body connected at its opposite ends to respective ones of a pair of suspension control arms such that the torsion bar is torsionally flexed by opposite suspension excursions of the control arms. The torsion bar, however, is also torsionally flexed by unequal excursions of the control arm in the same direction such as occur when the motor vehicle traverses an irregular road surface. Since an increase in the stiffness of the suspension system on an irregular road surface directly affects passenger comfort, torsional flexure of the torsion bar on such irregular road surfaces is usually a negative characteristic of typical roll stabilizers. A roll stabilizer described in U.S. Pat. No. 5,186,486, issued Feb. 16, 1993 and assigned to the assignee of this invention, includes an active link between an end of a U-shaped torsion bar and a suspension control arm. The rigidity of the active link is varied dynamically, i.e. during operation of the motor vehicle, by an electronic controller to selectively reduce the effective torsion modulus of the torsion bar when roll stabilization is not required. Similarly, U.S. Pat. No. 4,796,911 describes a roll stabilizer including a split U-shaped torsion bar having its opposite ends connected to respective ones of a pair of suspension control arms and a coupling filled with magnetic fluid between the two separate elements of the torsion bar. An electronic controller dynamically varies the stiffness of the coupling and, hence, the effective torsion modulus of the torsion bar by varying a magnetic field to which the magnetic fluid is exposed. A roll stabilizer according to this invention is a novel alternative to these dynamically variable roll stabilizers.

SUMMARY OF THE INVENTION

This invention is a new and improved dynamically variable roll stabilizer for a motor vehicle including a split U-shaped torsion bar on a body of the motor vehicle, a pair of rigid links between opposite ends the torsion bar and respective ones of a pair of suspension control arms of the motor vehicle, a mechanical coupling between the two separate elements of the torsion bar, and an electromagnetic actuator on the coupling. The coupling includes a pair of oppositely acting roller clutches between an outer housing rigidly attached to one of the two separate elements of the split torsion bar and a sleeve rigidly attached to the other of the two separate elements of the split torsion bar inside of the outer housing. The actuator includes a pair of control rings which engage and disengage the roller clutches, a pair of control levers on the control rings, and an electric solenoid suspended between the control levers. When the solenoid is on, the control levers are thrust together and the control rings disengage the roller clutches. When the solenoid is off, the control levers are thrust apart by a spring and the control rings engage the roller clutches. The effective torsion modulus of the torsion bar is maximum when the roller clutches are engaged and zero when the roller clutches are disengaged.

DESCRIPTION OF THE PREFERRED EMBODIMENT

Figure 1:
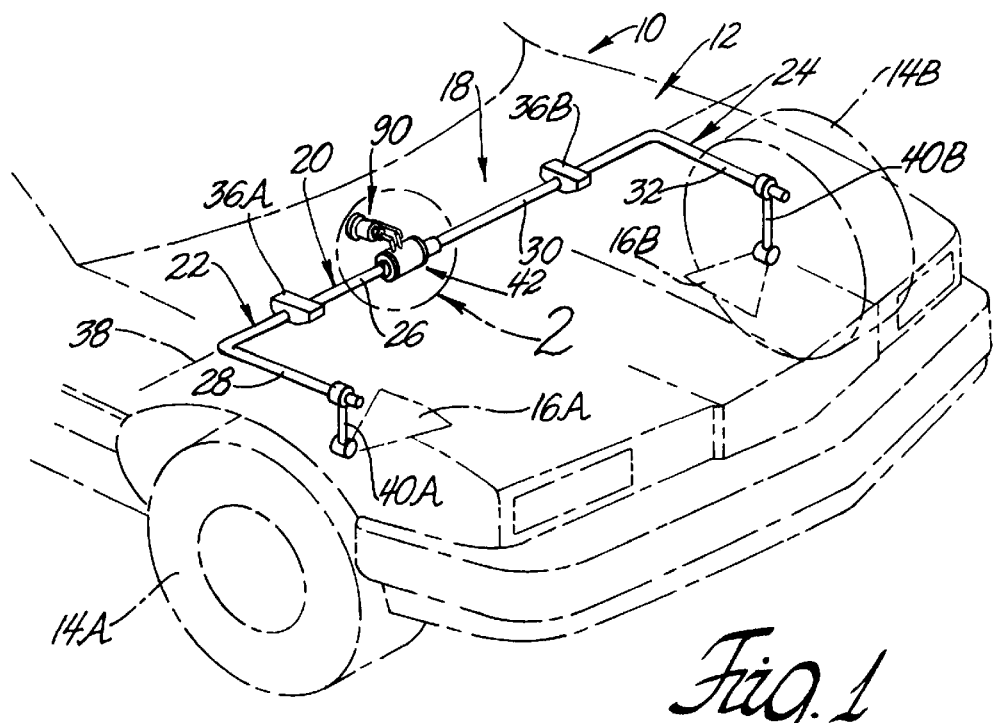
FIG. 1 is a schematic perspective view of a motor vehicle having thereon a roll stabilizer according to this invention.

Referring to FIG. 1, a fragmentarily and schematically illustrated motor vehicle 10 includes a body structure 12, a pair of dirigible wheels 14A,14B, and a pair of suspension control arms 16A, 1 6B between the body and the dirigible wheels. Suspension springs, not shown, resiliently support the body structure 12 on the control arms 16A,16B. The control arms pivot up and down and guide the dirigible wheels in vertical excursions relative to the body structure. A roll stabilizer 18 according to this invention is disposed between the body structure 12 and the suspension control arms 16A,16B.

The roll stabilizer 18 includes a split U-shaped torsion bar 20 consisting of a first L-shaped element 22 and a second L-shaped element 24. The first L-shaped element 22 includes a lateral segment 26 and a longitudinal segment 28. The second L-shaped element 24 includes a lateral segment 30 and a longitudinal segment 32. A pair of bearings 36A,36B cooperate with the lateral segments 26,30 in supporting the L-shaped elements 22,24 on the body structure 12 for independent pivotal movement about a lateral centerline 38 of the body structure. Opposite ends of the split torsion bar 20 are connected to respective ones of the suspension control arms 16A,16B through a pair of rigid links 40A,40B between the control arms and the distal ends of the longitudinal segments 28,32 of the L-shaped elements 22,24.

The roll stabilizer 18 further includes a coupling 42 between an inboard end 44 of the lateral segment 26 of the first L-shaped element of the split torsion bar and an inboard end 46 of the lateral segment 30 of the second L-shaped element of the split torsion bar. A first end cap 48 of the coupling 42 is disposed between the inboard ends 44,46 of the lateral segments 26,30 and is rigidly attached to the lateral segment 30 through a tubular stem 50 on the first end cap. A tubular outer housing 52 of the coupling is rigidly fastened to the first end cap concentric with the lateral centerline 38. A tubular sleeve 54 is rigidly attached to the lateral segment 26 of the L-shaped element 22 of the split torsion bar inside of the outer housing 52. An annular second end cap 56 around the tubular sleeve 54 is rigidly fastened to the outer housing 52 opposite the first end cap 48.

A pair of roller bearings 58A,58B between the sleeve 54 and the outer housing 52 adjacent to respective ones of the first and the second end caps 48,56 cooperate in supporting the inboard ends 44,46 of the lateral segments of the L-shaped elements 22,24 on each other for independent rotation about the lateral centerline 38. A fastener 60 screwed into the inboard end 44 of the lateral segment 26 through an aperture in the first end cap 48 at the bottom of the tubular stem 50 clamps the lateral segments 26,30 together in the direction of the lateral centerline 38. A plastic bearing 62 minimizes friction between the inboard ends of the lateral segments during relative rotation between the L-shaped elements 22,24.

A first roller clutch 62 of the coupling 42 in the annulus between the sleeve 54 and the outer housing 52 includes a cylindrical inner race 64 rigidly attached to the sleeve and a cylindrical outer race 66 rigidly attached to the outer housing.

Figure 4:
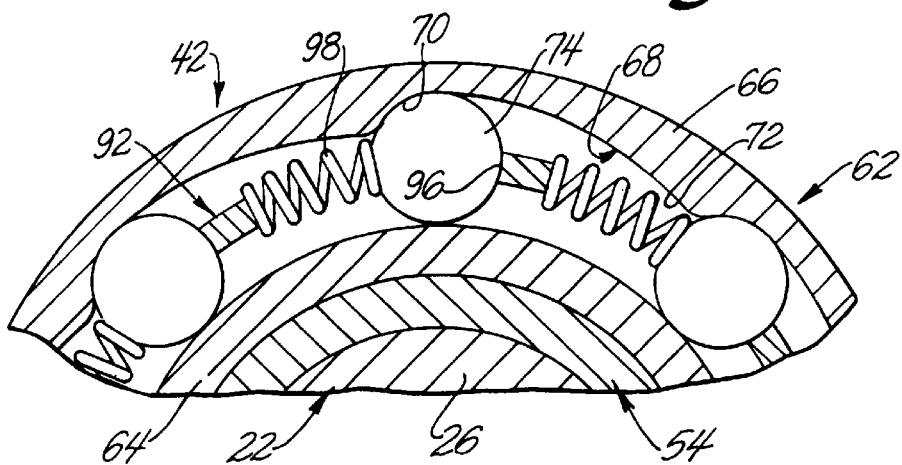
FIG. 4 is a fragmentary, enlarged sectional view taken generally along the plane indicated by lines 4—4 in FIG. 2.

The outer race 66 has a plurality of wedge-shaped cavities 68 therein facing the inner race 64 each of which tapers in a clockwise direction, FIG. 4, from a deep end 70 to a shallow end 72. A plurality of rollers 74 are disposed in respective ones of the wedge-shaped cavities 68. When the rollers 74 are lodged at the deep ends 70 of the wedge-shaped cavities 68, the roller clutch 62 is disengaged and relative rotation about the lateral centerline 38 between the lateral segments 26,30 of the L-shaped elements of the split torsion bar is unobstructed. When the rollers 74 are thrust toward the shallow ends 72 of the wedge-shaped cavities 68, the roller clutch 62 is engaged and the rollers wedge between the inner and the outer races 64,66 to rigidly couple the lateral segments 26,30 of the L-shaped elements of the split torsion bar for unitary clockwise rotation about the lateral centerline 38.

Figure 5:
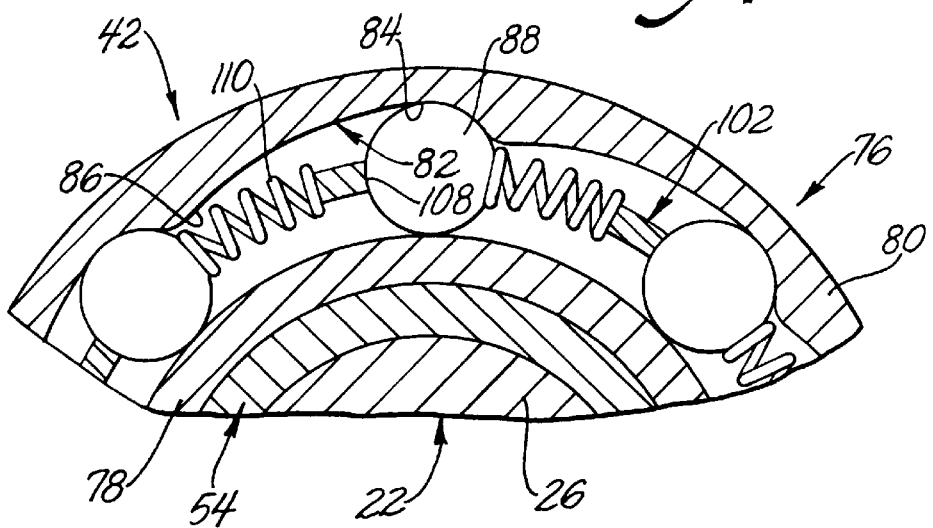
FIG. 5 is a fragmentary, enlarged sectional view taken generally along the plane indicated by lines 5—5 in FIG. 2.

A second roller clutch 76 of the coupling 42 in the annulus between the sleeve 54 and the outer housing 52 includes a cylindrical inner race 78 rigidly attached to the sleeve 54 and a cylindrical outer race 80 rigidly attached to the outer housing 52. The outer race 80 has a plurality of wedge-shaped cavities 82 therein facing the inner race 78 each of which tapers in a counterclockwise direction, FIG. 5, from a deep end 84 to a shallow end 86. A plurality of rollers 88 are disposed in respective ones of the wedge-shaped cavities 82. When the rollers 88 are lodged at the deep ends 84 of the wedge-shaped cavities 82, the second roller clutch 76 is disengaged and relative rotation about the lateral centerline 38 between the lateral segments 26,30 of the L-shaped elements of the split torsion bar is unobstructed. When the rollers 88 are thrust toward the shallow ends 86 of the wedge-shaped cavities 82, the second roller clutch 76 is engaged and the rollers wedge between the inner and the outer races 78,80 to rigidly couple the lateral segments 26,30 of the L-shaped elements of the split torsion bar for unitary counterclockwise rotation about the lateral centerline 38.

An electromagnetic actuator 90 of the coupling 42 includes a first control ring 92 adjacent to the first roller clutch 62 rotatable about the lateral centerline 38. The first control ring 92 has a plurality of slots 94 therein around respective ones of the rollers 74 of the first roller clutch. Each slot 94 has an uninterrupted edge 96 and an opposite edge interrupted by a spring pocket for a spring 98 which bears at one end against the first control ring and at the other end against the corresponding roller 74. A first control lever 100 is rigidly attached to the first control ring 92 and protrudes radially through a window in the outer housing 52.

The actuator 90 further includes a second control ring 102 adjacent to the second roller clutch 76 rotatable about the lateral centerline 38 and separated from the first control ring by a spacer 104. The second control ring 102 has a plurality of slots 106 therein around respective ones of the rollers 88 of the second roller clutch. Each slot 106 has an uninterrupted edge 108 and an opposite edge interrupted by a spring pocket for a spring 110 which bears at one end against the second control ring and at the other end against the corresponding roller 88. A second control lever 112 is rigidly attached to the second control ring and protrudes radially through the window in the outer housing 52.

Figure 2:
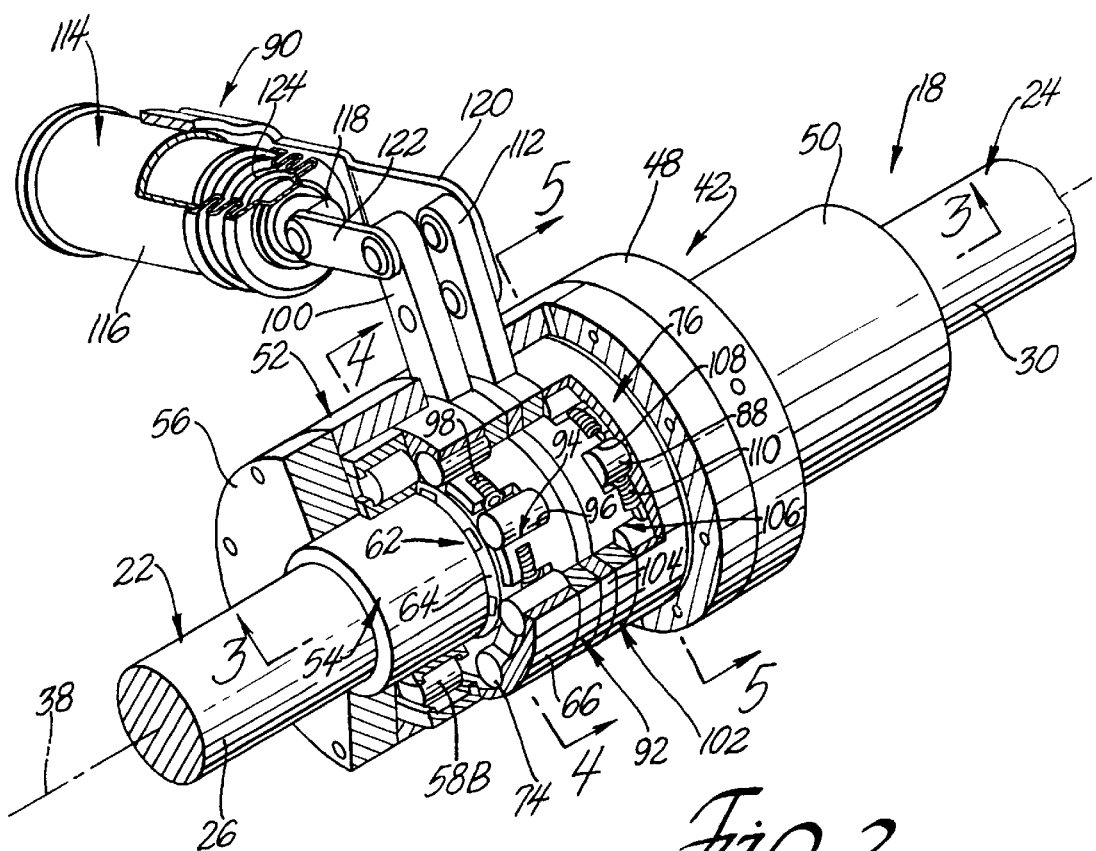
FIG. 2 is an enlarged partially broken-away view of the portion of FIG. 1 identified by reference circle 2 in FIG. 1.
Figure 3:
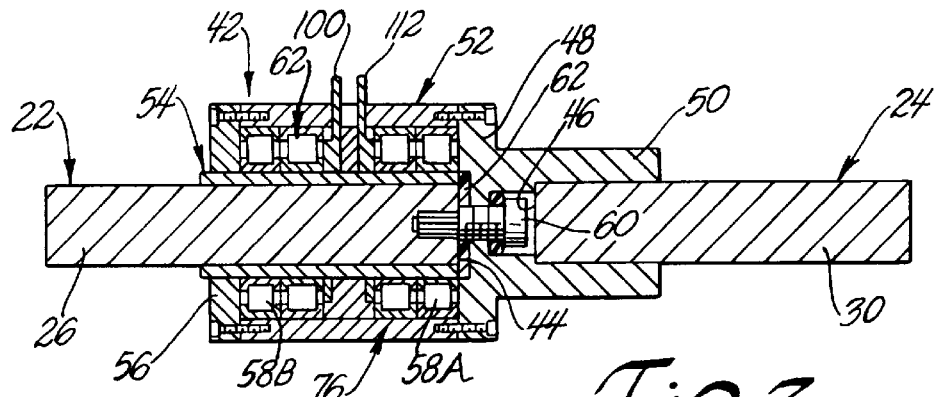
FIG. 3 is a sectional view taken generally along the plane indicated by lines 3—3 in FIG. 2.

As seen best in FIG. 2, an electric solenoid 114 of the actuator 90 includes a housing 116 and an armature 118 supported on the housing for back and forth linear translation. The housing 116 of the solenoid is suspended on the control lever 112 by a bracket 120. The armature 118 of the solenoid is connected to the control lever 100 by a link 122. A spring 124 between the housing 116 and the armature 118 biases the armature to an extended position, not shown, when the solenoid is off, i.e. when zero voltage is applied to a coil in the housing 116 around the armature, in which position the control levers 100,112 are thrust apart. When the solenoid is on, voltage is applied to the coil around the armature and the resulting magnetic field induces a linear stroke of the armature from its extended position to a retracted position, FIG. 2, during which stroke the control levers 100,112 are thrust together.

When the solenoid 114 is on and the control levers 100,112 are thrust together against the separating force of the spring 124, the uninterrupted edges 96,108 of the slots 94,106 in the first and the second control rings engage the rollers 74,88 of the first and the second roller clutches and thrust the rollers into the deep ends 70,84 of the wedge shaped cavities 68,82, respectively. Accordingly, when the solenoid 114 is on, the roller clutches are disengaged and the inboard ends of the lateral segments of the L-shaped elements of the split torsion bar are freely rotatable relative to each other so that the effective torsion modulus of the split torsion bar 20 is zero.

When the solenoid is off and the first and the second control levers 100,112 are thrust apart by the spring 124, the uninterrupted edges of the slots 94,106 in the first and the second control rings separate from the rollers 74,88 of the first and the second roller clutches and the springs 98,110 thrust the rollers toward the shallow ends 72,86 of the wedge shaped cavities 68,82, respectively. In that circumstance, the roller clutches are engaged and the onset of clockwise rotation, FIG. 4, of the lateral segment 26 of the L-shaped element 22 relative to the lateral segment 30 of the L-shaped element 24 wedges the rollers 74 between the inner and the outer races 64,66 of the first roller clutch so that the lateral segments 26,30 are rigidly coupled for unitary clockwise rotation. At the same time, the onset of counterclockwise rotation, FIG. 5, of the lateral segment 26 of the L-shaped element 22 relative to the lateral segment 30 of the L-shaped element 24 wedges the rollers 88 between the inner and the outer races 78,80 of the second roller clutch so that the lateral segments 26,30 are rigidly coupled for unitary counterclockwise rotation. With the lateral segments thus rigidly coupled in both directions of rotation about the lateral centerline 38, the effective torsion modulus of the split torsion bar is maximum.

An electronic controller, not shown, on the motor vehicle body structure 12 receives electronic signals from transducers which monitor selected operating conditions of the vehicle and turns the electric solenoid 114 on and off in accordance with a schedule stored in a memory in the controller. For example, when a transducer signals the onset of a turn and the stored schedule for that operating condition dictates that the effective torsion modulus of the split torsion bar 20 be maximum, the electronic controller turns off the electric solenoid so that the coupling 42 rigidly unites the lateral segments 26,30 of the L-shaped elements of the split torsion bar. Conversely, when a transducer signals that the motor vehicle is traversing an uneven road surface and the stored schedule for that operating condition dictates that the effective torsion modulus of the split torsion bar 20 be zero, the electronic controller turns on the solenoid 114 so that the coupling 42 uncouples the lateral segments of the L-shaped elements of the split torsion bar for independent rotation about the lateral centerline 38.

Having thus described the invention, what is claimed is:

1. A roll stabilizer for a motor vehicle having a body structure and a pair of dirigible wheels connected to said body structure by respective ones of a pair of suspension control arms pivotable up and down on said body structure comprising:

a split U-shaped torsion bar having a first L-shaped element and a second L-shaped element, a bearing means operative to support a lateral segment of each of said first and said second L-shaped elements on said body structure for independent rotation about a lateral centerline of said body structure, a link means operative to connect a distal end of a longitudinal segment of each of said first and said second L-shaped elements to respective ones of said pair of suspension control arms, a mechanical coupling means operative to selectively couple and uncouple said lateral segments of said first and said second L-shaped elements when said mechanical coupling means is engaged and disengaged to change the effective torsion modulus of said split torsion bar from maximum when said mechanical coupling means is engaged to zero when said mechanical coupling means is disengaged, and an actuator means suspended on said mechanical coupling means operative to engage and disengage said mechanical coupling means.

2. The roll stabilizer recited in claim 1 wherein said mechanical coupling means comprises:

a first roller clutch means operative to selectively couple said lateral segments of said first and said second L-shaped elements for unitary rotation about said lateral centerline of said body structure in a first direction when said first roller clutch means is engaged and to uncouple said lateral segments of said first and said second L-shaped elements for independent rotation about said lateral centerline of said body structure when said firs t roller clutch means is disengaged, and a second roller clutch means operative to selectively couple said lateral segments of said first and said second L-shaped elements for unitary rotation about said lateral centerline of said body structure in a second direction opposite to said first direction when said second roller clutch means is engaged and to uncouple said lateral segment of said first and said second L-shaped elements for independent rotation about said lateral centerline of said body structure when said second roller clutch means is disengaged.

3. The roll stabilizer recited in claim 2 wherein each of said first and said second roller clutch means comprises:

an inner race, an outer race having a plurality of wedge-shaped cavities therein facing said inner race each including a deep end and a shallow end, and a plurality of rollers disposed in respective ones of said wedge-shaped cavities, each of said first and said second roller clutch means being disengaged when said rollers are lodged in said deep ends of respective ones of said wedge-shaped cavities and engaged when said rollers are thrust toward said shallow ends of respective ones of said wedge-shaped cavities.

4. The roll stabilizer recited in claim 3 wherein said actuator means comprises:

an electromechanical actuator means.

5. The roll stabilizer recited in claim 4 wherein said electromagnetic actuator means comprises:

an electric solenoid including a housing and an armature supported on said housing for linear translation between a first position when said electric solenoid is off and a second position when said electric solenoid is on, a spring biasing said armature toward said first position thereof, and a control means operative to engage concurrently each of said first and said second roller clutches when said electric solenoid is off and to disengage concurrently each of said first and said second roller clutches when said electric solenoid is on.

6. The roll stabilizer recited in claim 5 wherein said control means comprises:

a first control ring adjacent said first roller clutch rotatable about said lateral centerline of said body structure, a second control ring adjacent said second roller clutch rotatable about said lateral centerline of said body structure, a first control lever on said first control ring, a second control lever on said second control ring, a mounting means operative to mount said housing of said solenoid on a first one of said first and said second control levers, a connecting means operative to connect said armature of said solenoid to a second one of said first and said second control levers, a first roller thrusting means on said first control ring operative when said electric solenoid is on to thrust each of said rollers in said first roller clutch to said deep end of the corresponding one of said wedge-shaped cavities and when said electric solenoid is off to thrust each of said rollers in said first roller clutch to said shallow end of the corresponding one of said wedge-shaped cavities, and a second roller thrusting means on said second control ring operative when said electric solenoid is on to thrust each of said rollers in said second roller clutch to said deep end of the corresponding one of said wedge-shaped cavities and when said electric solenoid is off to thrust each of said rollers in said second roller clutch to said shallow end of the corresponding one of said wedge-shaped cavities.

7. The roll stabilizer recited in claim 6 wherein each of said first and said second roller thrusting means comprises:

a plurality of slots in each of said first and said second control rings around respective ones of said rollers in each of said first and said second roller clutches, each of said slots having an uninterrupted edge on one side of said respective roller therein and an opposite edge on the other side of said respective roller therein interrupted by a spring pocket, and a spring in each of said spring pockets having a first end seated on said roller in the corresponding one of said spring pockets and a second end seated on a corresponding one of said first and said second control rings.

* * * * *